Figures 1, 2:
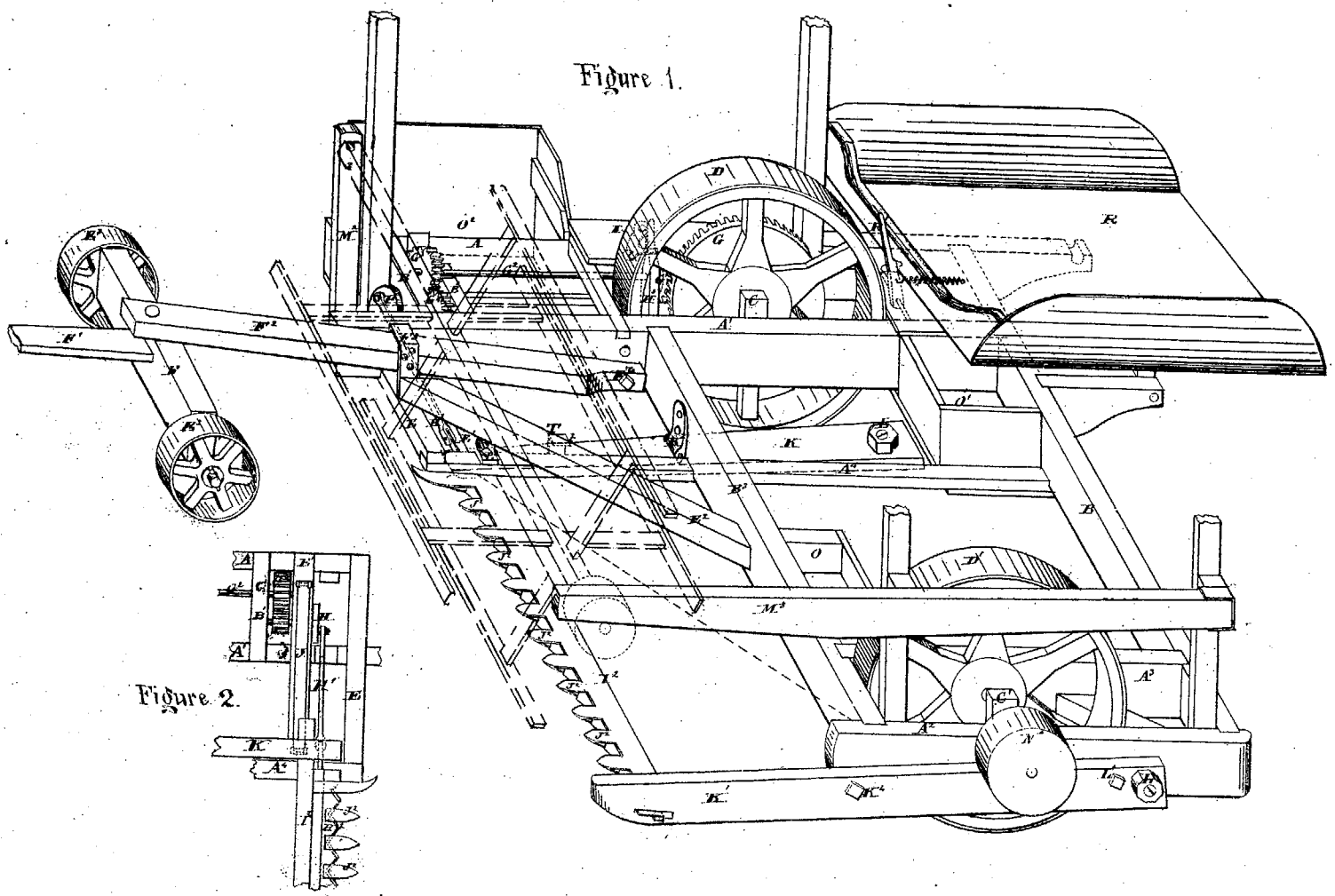

Sylla and Adams,
Mower.

No. 726

Reissued May 17. 1859

UNITED STATES PATENT OFFICE.

PHILO SYLLA, OF ELGIN, AND AUGUSTUS ADAMS, OF SANDWICH, ILLINOIS, ASSIGNORS TO C. AULTMAN & CO., OF CANTON, OHIO.

IMPROVEMENT IN GRAIN AND GRASS HARVESTERS.

Specification forming part of Letters Patent No. 10,038, dated September 20, 1853; Reissue No. 726, dated May 17, 1859.

DIVISION F.

*To all whom it may concern:*

Be it known that PHILO SYLLA, of Elgin, in the county of Kane and State of Illinois, and AUGUSTUS ADAMS, formerly of the same place, but now residing at Sandwich, in the county of De Kalb, in said State, invented certain new and useful Improvements in Machines for Harvesting Grain, Mowing Grass, &c., of which the following is a full, clear, and exact description, reference being had to the annexed drawings, which make part of this specification, and in which—

Figure 1 is a view in perspective of a machine, showing one mode of applying said improvements, the finger-beam being raised from the ground to adapt the machine for reaping. Fig. 2 represents a plan of a portion of the under side of the machine, to exhibit more fully the flexible connection of the finger-beam with the main frame. Fig. 3 represents a plan of the machine, the finger-beam resting on the ground to adapt the machine for mowing. Fig. 4 represents a vertical transverse section of the machine at the line 1 1 of Fig. 3. Fig. 5 represents a vertical longitudinal section of the same at the line 2 2 of Fig. 3; and Fig. 6 represents a plan of the cutting apparatus, the finger-beam, and the coupling-arm for connecting the finger-beam to the main frame. Fig. 7 is a vertical section at the line 3 3 of Fig. 6, showing the provision for allowing play in the joint between the finger-beam $l^2$ and the yielding bar K.

That side of the machine which runs next the standing grain we call the "left" side, and the other, at which the horses are placed, we call the "right" side.

The accompanying drawings represent a machine having a frame large enough to support, in addition to the cutting apparatus and machinery required for mowing, a removable platform placed behind the cutter, (such as is common in ordinary machines adapted to reaping and mowing,) an elevated table behind the platform to bind the grain upon, stands for a raker and binders, a dumping-tray to carry the sheaves until a sufficient quantity for a shock has accumulated, and then to dump them in a heap upon the ground, and a stand or place for the driver of the team by which the machine is drawn.

Whenever it may be expedient to use one or more of the several parts or branches of said improvements separate from the rest, such part or parts might be used in connection with frames and gearing more convenient than those herein described, which are proportioned and arranged with reference to the use of the whole of the parts together; and it is obvious that several parts of the said improvements are applicable to various other reaping or mowing machines in use. One mode of applying each of these improvements to practical use is shown in this machine. It is therefore unnecessary to specify the manner of applying the parts, respectively, to other machines, as the ordinary skill of a constructer is sufficient for that purpose.

When the finger-beam of a harvesting-machine is so connected to the main frame that it is free to rise and fall at either end, and, while moving over uneven ground, free to accommodate itself to inequalities in the surface of such ground, and has its upward and downward movement controlled by such inequalities when the machine is passing across ditches or other like narrow depressions, at right angles thereto, the finger-beam drops down to the bottom of such ditches, and the progress of the machine forces the cutting apparatus into the bank, thereby producing a dangerous strain and often stopping the machine. To obviate this difficulty in crossing ditches and furrows without interfering with the freedom of the finger-beam to conform to the general irregularities of the surface of the ground, which in land adapted to being mowed by a machine chiefly consists of gentle undulations, the said inventors have combined with the mechanism by means of which the finger-beam is connected to the main frame and allowed to rise and fall a stop so arranged that while it will not interfere with the rising of the beam it will arrest its descent at the end next the main frame after having fallen a little below the level of the top of the ditch or furrow, and will carry the beam, suspended to the main frame, over the ditch until it strikes the surface of the ground on the opposite side, thus preventing the difficulties that would arise from the beam dropping bodily into the ditches and furrows when it is necessary for the machine to cross them. This stop is the improvement which it is designed to secure under this patent.

As the several parts of the machine are fully described in other patents granted to us at the same time and bearing the same date as this, we deem it necessary to describe particularly in this patent such parts only as relate more immediately to the improvement claimed herein.

The right end of the finger-beam $I^2$ in this machine is connected to the frame by means of a strong link or coupling-arm, J, hinged at its left end to the right end of the finger-beam and at its right end to a cross-beam, E′, of the main frame.

The progressive motion of the frame on its wheels carries forward the coupling-arm, and that in its turn carries forward the finger-beam and cutter, and as the coupling-arm is rigid laterally only, and its left end (to which the finger-beam is connected) free to rise and fall, the finger-beam necessarily rests on the surface of the ground when not adjusted for reaping. Therefore in passing over undulating ground the finger-beam will rise or fall at either or both ends and sway up and down within certain limits, as may be required, to conform to the surface of the ground.

The coupling-arm and finger-beam are supported by a yielding bar or brace, K, extending from the junction of the left end of the coupling-arm with the right end of the finger-beam backward, and connected by a hinge, $K^2$, to the cross-bar $B^3$ of the frame. Since, however, this machine is designed for reaping as well as mowing, and must therefore be capable of carrying a platform whenever it is required to be used as a reaper, and must likewise be capable of carrying the finger-beam at the same time at a height of several inches above the ground, a second yielding bar, K′, is provided to support the left end of the finger-beam, to which it is attached at its forward end, and is hinged to the side rail, $A^2$, of the frame on a pivot, $K^4$.

If the machine should be crossing a ditch, with the finger-beam parallel or but little inclined to the same, from the readiness with which the beam conforms itself to the surface of the ground it would of course drop bodily into the ditch, and the cutting apparatus abutting against the bank would cause a sudden shock, that would strain, if it did not break, the machine. To prevent such difficulties a stop is provided, which operates to limit the descent of the right end of the finger-beam below the level of the track which the driving-wheel would make when crossing the ditch, but will not restrict its rising. In this instance the stop is made in the form of a hook, T, and is attached rigidly in an upright position to the yielding bar K, so as to overhang one of the beams $A^4$ of the gearing-frame. The lip *t* of this hook is generally carried at some distance above the frame; but when the cutting apparatus is passing across a ditch or other like depression of the ground, then the lip of the hook rests upon the frame, suspending the right end of the finger-beam, with the coupling-arm J and bar K attached, and carrying them over the ditch. When the right end of the finger-beam is thus carried over a depression the left end in general passes through without danger, rendering it inexpedient to arrange a stop at that end also.

What is claimed under this patent as the invention of the said SYLLA and ADAMS is—

The combination of a stop with the mechanism for connecting the finger-beam with the main frame and allowing it to rise and fall, substantially as herein set forth.

In testimony whereof we have hereunto subscribed our names.

CORNELIUS AULTMAN,
LEWIS MILLER,
THOMAS R. TONNER,
JACOB MILLER,
GEORGE COOK,
*Comprising the firm of C. Aultman & Co.*

Witnesses:
DANIEL GOTSHALL,
ISAAC HAZLETT.